(12) United States Patent
Gonsalves

(10) Patent No.: US 7,659,935 B1
(45) Date of Patent: Feb. 9, 2010

(54) VIDEO CAMERA UTILIZING SEQUENTIAL DIVERSITY IMAGING FOR IMAGE CLARIFICATION

(76) Inventor: Robert A. Gonsalves, 16 Lexington St., Woburn, WA (US) 01801

(*) Notice: Subject to any disclaimer, the term of this patent is extended or adjusted under 35 U.S.C. 154(b) by 677 days.

(21) Appl. No.: 10/798,004

(22) Filed: Mar. 12, 2004

Related U.S. Application Data

(63) Continuation-in-part of application No. 09/905,693, filed on Nov. 14, 2000, now abandoned.

(51) Int. Cl.
H04N 5/225 (2006.01)
G01J 1/20 (2006.01)

(52) U.S. Cl. .................... 348/335; 250/201.9

(58) Field of Classification Search .............. 359/16, 359/256; 250/201.9, 201.8
See application file for complete search history.

(56) References Cited

U.S. PATENT DOCUMENTS

| | | | |
|---|---|---|---|
| 4,309,602 A * | 1/1982 | Gonsalves et al. | 250/201.9 |
| 5,300,766 A * | 4/1994 | Granger et al. | 250/201.9 |
| 6,107,617 A * | 8/2000 | Love et al. | 250/201.9 |
| 6,771,422 B1 * | 8/2004 | Clark | 359/625 |
| 6,910,770 B2 * | 6/2005 | Campbell | 351/205 |
| 6,911,637 B1 * | 6/2005 | Vorontsov et al. | 250/201.9 |

* cited by examiner

Primary Examiner—Luong T Nguyen

(57) ABSTRACT

A video camera with an adaptive optic device, digital images, and a sequential diversity processor can reduce the optical aberrations introduced by a changing optical medium so as to produce sharper clarified images. The change in the optics between sequential video frames is diversity information which allows the sequential diversity processor to estimate both the object under observation and the aberration. No additional information, such as a defocused image or other sensing device, is required. The concept could be used in any video camera which outputs digital images and uses a digital processor to control the adaptive optic device between sequential frames.

1 Claim, 3 Drawing Sheets

VIDEO CAMERA UTILIZING SEQUENTIAL DIVERSITY IMAGING FOR IMAGE CLARIFICATION

The present invention is a Continuation-in-Part of application Ser. No. 09/905,693 entitled, "Sequential Diversity Imaging," filed on Nov. 14, 2000, now abandoned and it relates to imaging through a random optical medium, such as the turbulent atmosphere or the slowly changing characteristics of a video camera.

BACKGROUND OF THE INVENTION

Wavefront sensing is employed to determine the distorting wavefront caused by the turbulent atmosphere and one or more the following methods are generally employed to provide an estimate of the distorting wavefront.

1. Dithering. This method of wavefront sensing continuously changes the adaptive optics and monitors the image quality of the observed image. U.S. Pat. No. 3,979,585 entitled "Adaptive imaging telescope with camera-computer transform image quality sensing and electro-optic phase shifting" and the publication by M. A. Voronstov and V. P. Sivokon, entitled "Stochastic parallel-radiant-descent technique for high-resolution wave-front phase-distortion correction," J. Opt. Soc. Am., A, 15,2745 (1988) are examples of this approach. They are sequential techniques, in the sense that a physical property of the adaptive optics is changed. and if the next (time-sequential) image is sharper the change is increased, otherwise the change is reversed. This is a physical search for "best focus" and is how the human eye and most cameras work.

2. Shearing Interferometer. This method of wavefront sensing uses a reference beam to create an interference pattern, from which the unknown wavefront is estimated. It requires a laser-based interferometer. U.S. Pat. No. 3,923,400 entitled "Real-time wavefront correction system" describes this approach.

3. Shack-Hartmann Sensor. This device employs an array of lenses to focus multiple, small images, each seen through a different section of the aperture, onto a detector. Shifts in the small images are caused by local tilts in the waveform, which allows the wavefront to be reconstructed. U.S. Pat. No. 4,141,652 entitled "Sensor system for detecting wavefront distortion in a return beam of light" and U.S. Pat. No. 5,350,911 entitled "Wavefront error estimation derived from observation of arbitrary unknown extended scenes" disclose the use a Shack-Hartmann sensor.

4. Curvature Sensing. This method is described in the publication by F. Roddier et al. entitled "A simple low-order adaptive optics system for near-infrared applications," Publications of the Astronomical Society of the Pacific, 103,131 (1991), whereby two or more images are measured along the path of the optical system. The local curvature of the propagating wave is determined and it is propagated, by computer calculation, back to the aperture to form the wavefront estimate.

5. Phase diversity. This method employs diverse images, measured simultaneously whereby the diversity is a quadratic phase shift, which can be introduced by defocusing the optical system. Additional equipment in needed to record the out-of-focus image. U.S. Pat. No. 4,309,602 entitled "Wavefront sensing by phase retrieval", U.S. Pat. No. 5,384,455 entitled "Measurement-diverse speckle imaging", U.S. Pat. No. 5,610,707 entitled "Wavefront sensor for a staring imager", U.S. Pat. No. 6,107,617 entitled "Liquid crystal active optics correction for large space based optical systems", and the publication by R. Paxman, et al. entitled "Optical misalignment sensing and image reconstruction using phase diversity," J. Opt. Soc. Am., A, 5, 914 (1988), each use phase diversity to estimate the wavefront. It is noted that the phase diversity approach to wavefront sensing was used to determine the aberration in the Hubble telescope project.

Note that all of the patents mentioned in the section on phase diversity use an in-focus image, an out-of-focus image, and a fixed diversity to perform wavefront sensing, as opposed to the current invention which uses sequential, in-focus images and sequential diversities which are the sequential changes in the adaptive optic device. The invention does not need additional equipment, such as an out-of-focus image, to control an adaptive optic device in the camera system.

One purpose of the instant invention is to provide a system for determining aberrations within a video camera or the optical medium and to eliminate the aberrations using no additional optics or sensors.

SUMMARY OF THE INVENTION

The invention describes a video camera which produces digital clarified images of an object which is distorted by time-varying aberrations in the optical medium. It uses an adaptive optics device to eliminate the aberrations and a sequential diversity processor to produce the control signals for the adaptive optic device. The sequential diversity processor uses sequential, in-focus frames of the camera, each with a known diversity such as phase, wavelength, or spatial shift, to deduce both the unknown object and the aberrations in the optical medium. Sequential frames are the diverse images and the changes in the adaptive optics, per se, are used as the diversities. Unlike other diversity Imaging methods no other auxiliary equipment or signal, such as an intentionally defocused image, is needed to control the adaptive optic device.

DESCRIPTION OF THE PREFERRED EMBODIMENT

Figure 1:
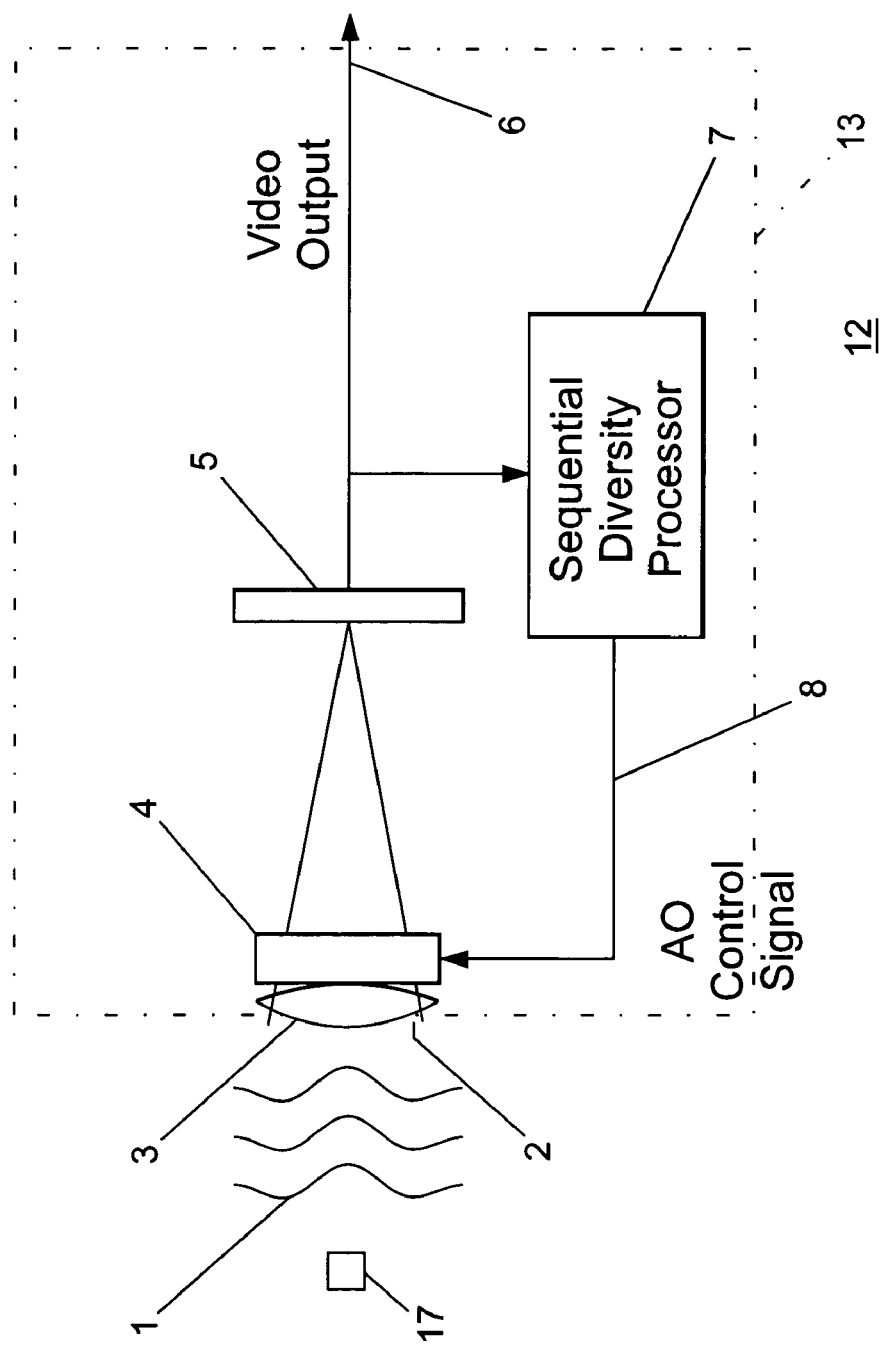
FIG. 1 is a diagrammatic representation of the imaging system, which employs an adaptive optic and a sequential diversity processor within a video camera, in accordance with the invention.

The sequential diversity imaging system 12 within the video camera 13 depicted in phantom in FIG. 1, receives an optical signal 1 which may have aberrations introduced by a randomly changing optical medium. The optical signal passes through the camera aperture 2 and is imaged by a lens 3. Between lens 3 and detector 5 is an Adaptive Optic 4, hereinafter, "AO". This portion of the invention is called the optical system, as described in the publication entitled "Phase retrieval and diversity in adaptive optics," R. A. Gonsalves Opt. Eng., 21, 829 (1982) and as further described in U.S. Pat. No. 4,309,602. The optical system produces a clarified in-focus optical image of the distorted object In the focal plane of the lens 3. The AO 4 modifies the optical properties of the optical energy it receives from the lens so as to cancel aberrations in the object being viewed. It also receives digital signals from the sequential diversity processor 7, signals which control the AO 4.

The output of detector 5 is a video sequence of digital images, as indicated at 6. This sequence of digital in-focus images is the input to a Sequential Diversity Processor 7 which produces digital control signals 8 to control the configuration of the AO, so as to cancel the aberrations introduced by the random optical medium. The AO could comprise a high-resolution device to allow a wide range of correction mechanisms, such as Zernike polynomial fitting of a complicated wavefront.

Figure 2:
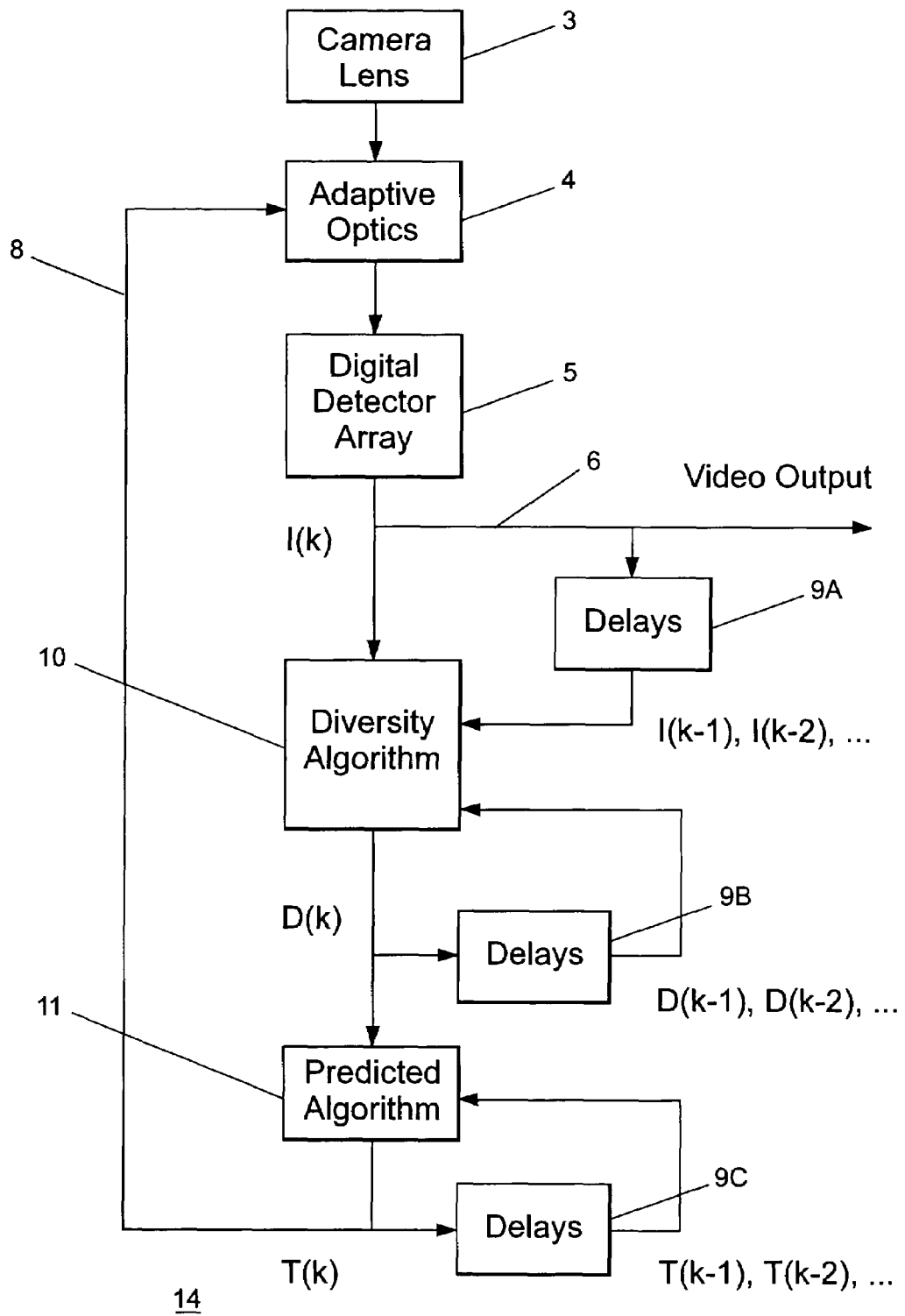
FIG. 2 is a flow chart representation of the imaging system and the sequential diversity algorithm used within the sequential diversity processor of FIG. 1.

FIG. 2 depicts the image flow through the lens 3, AO 4, detector 5 and the processing of data within the Diversity Algorithm 10 and the Predicted Algorithm 11. The $k^{th}$ frame of the video output 6, I(k), is an input to the Diversity Algorithm 10. Other inputs to the Diversity Algorithm 10 are successively delayed versions of I(k), namely I(k−1), I(k−2), . . . , which are delayed and stored in a digital buffer Delays 9A. The $k^{th}$ output of the Diversity Algorithm, D(k), and delayed versions from Delays 9B, are used as inputs to the Diversity Algorithm 10. D(k) is an input to the Predicted Algorithm 11 which predicts the change in the random optical medium for the next frame of the video sequence and controls the AO 4 with a control signal T(k) as indicated at 8. The other inputs to the Predicted Algorithm 11 are delayed versions T(k−1), T(k−2), - - - , from Delays 9C, of the control signal T(k).

To further describe the flow diagram of FIG. 2, the following notations assume that the media aberration is due to an unknown wavefront distortion, which is typical of atmospheric distortion:

$$W(k) = \text{Unknown distorting wavefront at time } k. \quad (1)$$

$$T(k) = \text{Phase on the } AO \text{ at time } k$$

$$C(k) = \text{Residual phase to be estimated}$$

$$= W(k) + T(k).$$

$$I(k) = \text{Measured image at time } k.$$

$$D(k) = \text{Diversity phase.}$$

With I(k−1) as the first image and I(k) as the diversity image, the diversity phase D(k) is the change in the AO phase from time k−1 to time k, such that:

$$D(k)=T(k)-T(k-1). \quad (2)$$

Let Q(k) represent the estimate of C(k), as in equation (1), $$Q(k)=W1(k)+T(k), \quad (3)$$

where $W1(k)$ is an estimate of $W(k)$, the unknown phase at time k. At time k+1 the AO should be set to the negative of the unknown distorting wavefront W(k+1) at time k+1. An estimate of the distorting wavefront at time k, $W1(k)$, provides a good estimate of W(k+1) when AO updates are within the time constant of the changing optical medium. Therefore:

$$T(k+1)=-W1(k), \quad (4)$$

which tends to cancel the wavefront distortion at k+1.

Solving (3) for $W1(k)$ and substituting into equation (4), results in $$T(k+1)=-Q(k)+T(k), \text{ which implies}$$

$$T(k)=-Q(k-1)+T(k-1). \quad (5)$$

To find the diversity phase D(k) insert equation (5) into equation (2) whereby $$D(k)=(-Q(k-1)+T(k-1))-T(k-1)=-Q(k-1).$$

The new diversity D(k) is now defined as $$D(k)=-Q(k-1), \quad (6)$$

which provides the diversity at time k.

Inserting equation (6) into equation (5) results in the new AO control signal:

$$T(k)=D(k)+T(k-1), \quad (7)$$

which is a simple restatement of equation (2).

Equations (6) and (7) result in the sequential diversity imaging function in accordance with the invention.

In summary, the sequential diversity algorithm 10 and predicted algorithm 11 of FIG. 2 contained within the sequential diversity processor 7 of FIG. 1 employ the diversity D(k−1) and the diverse images, I(k) and I(k−1), to calculate an estimate Q(k−1) of the residual phase C(k−1). The new diversity, D(k), is set to the negative of Q(k−1), according to equation (6), and it is added to the previous AO setting to form the new AO setting, T(k), according to equation (7).

Figure 3:
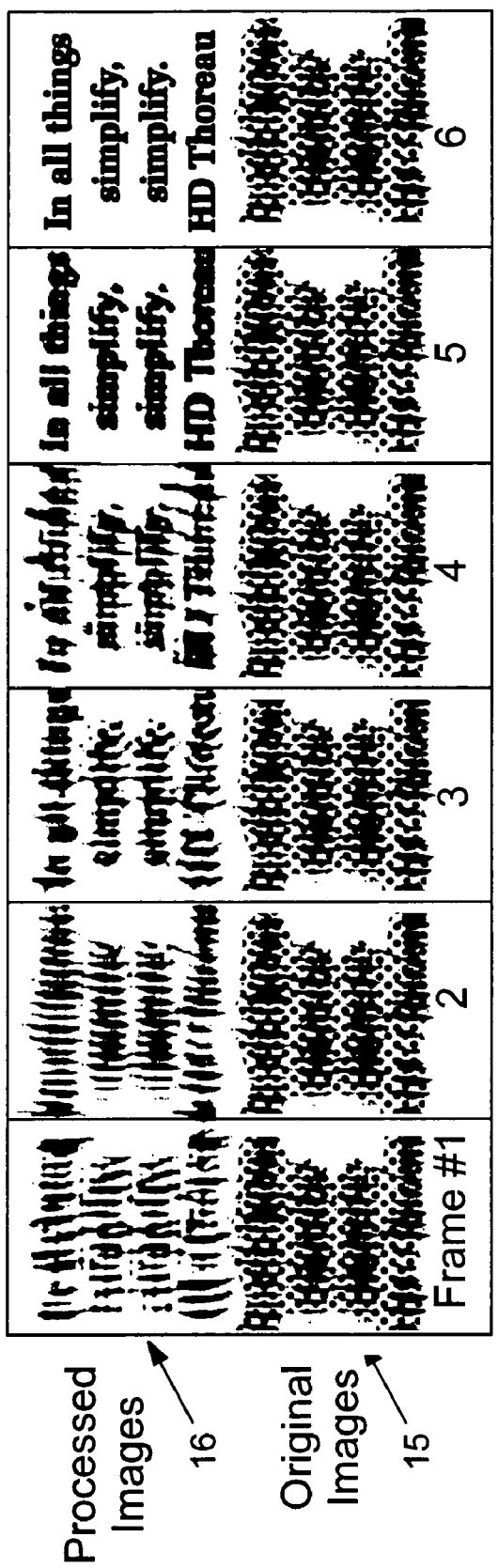
FIG. 3 depicts a computer simulation of 6 frames of a video sequence achieved within the video camera of FIG. 1.

FIG. 3 depicts a computer simulation of frames 1-6 as achieved within the sequential diversity processor 7 within the video camera 13 of FIG. 1. The object 17 comprises four lines of text viewed through a turbulent atmosphere 1 via the video camera lens 3. The original unprocessed images 15 of the text are shown in lower regions of each frame and the processed images 16 are shown in the upper regions thereof. Comparing the original images 15 to the processed images 16 within each frame depicts how the processed images are clear and readable within 6 frames. The Strehl ratio, the ratio of the peak value of the unprocessed Point Spread Function, "PSF" to the peak value of the processed PSF as described in the aforementioned publication "Phase retrieval and diversity in adaptive optics," wherein higher Strehl ratio defines higher image quality is now employed to determine image quality for the original unprocessed images 15 and the processed images 16. For the 6 original unprocessed images depicted in FIG. 3, the average Strehl ratio is 0.09 whereas the average Strehl ratio for the processed images is 0.48, which results in an improvement of about a factor of 5.

Accordingly, the invention teaches sequential diversity imaging within a video camera for determining the aberrations caused by the optical medium and for controlling an adaptive optic device in the optical system to eliminate the aberrations. The adaptive optic device clarifies the image as it appears on the detector in the lens' focal plane and the detector produces a sequence of digital clarified in-focus images. These solely in-focus images are the input to the sequential diversity processor which estimates the residual phase emerging from the AO, the diversity to be used in the next cycle of the diversity algorithm, and the control signal for the AO device. No out-of focus images are needed nor is an additional detector needed to measure a defocus image, as is the case with conventional phase diversity systems identified in the above section, entitled Background of the Invention.

What is claimed is:

1. A video camera with enhanced image clarification comprising:
an imaging system with an adaptive optic device arranged for canceling aberrations introduced by an optical medium to produce adapted in-focus digital images of an object; and a sequential diversity processor using said adapted in-focus digital images as diverse images and using changes in said adaptive optic device as diversities to calculate control signals for said adaptive optic device;

wherein said sequential diversity processor utilizes diversity $D(k-1)$, the diversity at time $k-1$, along with current and previous digital images, $I(k)$ and $I(k-1)$, as the diverse images to produce $Q(k-1)$, an estimate of a residual aberration in an adapted in-focus digital image of said object at time $k-1$; wherein said sequential diversity processor sets diversity $D(k)$ to the negative of the estimate of the residual aberration, that is, $D(k)=-Q(k-1)$; and wherein $T(k-1)$, the signal produced by the sequential diversity processor to control the adaptive optic device at time $k-1$, is added to $D(k)$, to produce a control signal at time $k$, that is, $T(k)=T(k-1)+D(k)$, which also implies that $D(k)=T(k)-T(k-1)$.

* * * * *